Jan. 5, 1932.  L. O. LUCKA ET AL  1,840,239
VEHICLE DIRECTION SIGNAL
Filed April 14, 1930  2 Sheets-Sheet 1
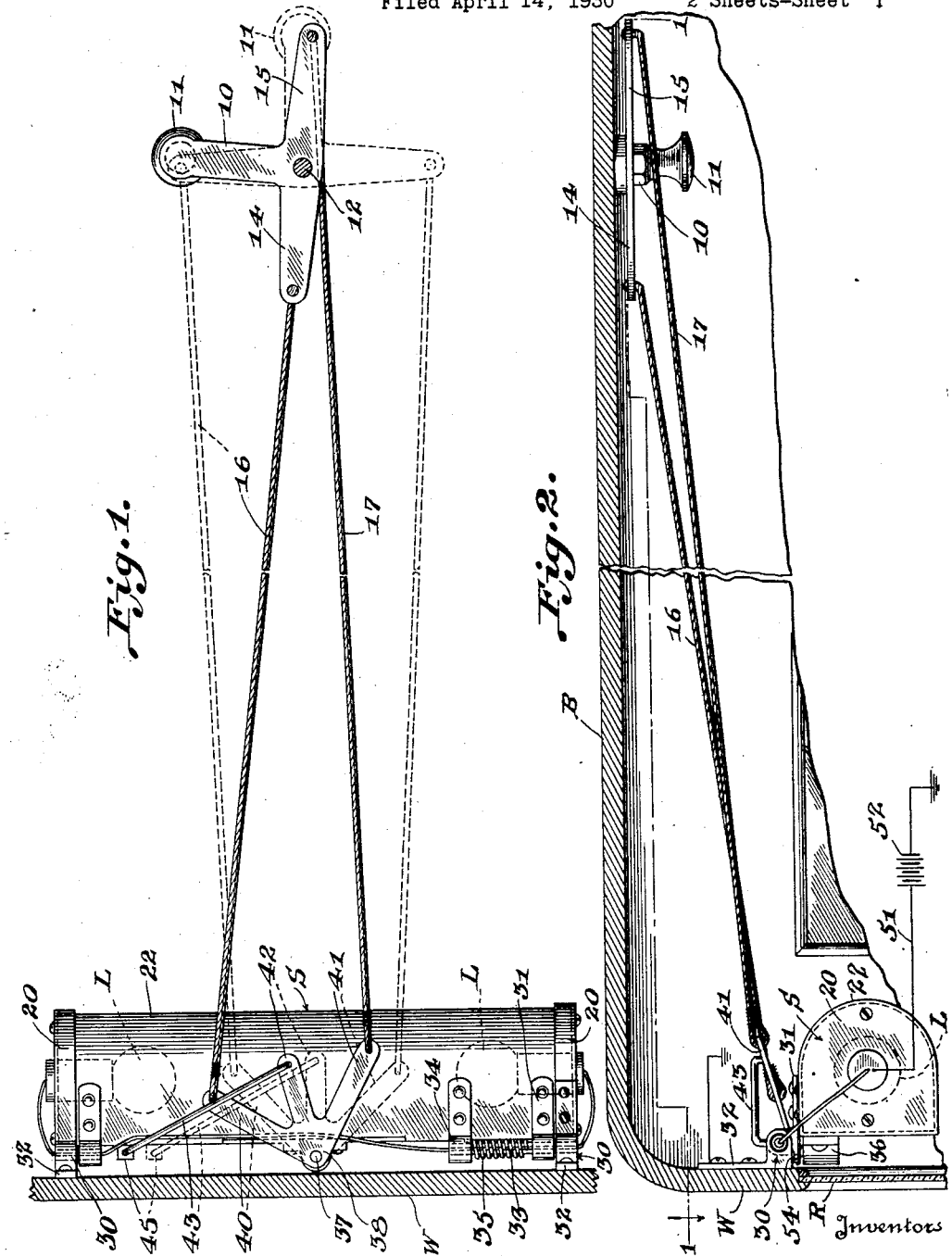

Jan. 5, 1932.     L. O. LUCKA ET AL     1,840,239
VEHICLE DIRECTION SIGNAL
Filed April 14, 1930     2 Sheets-Sheet 2
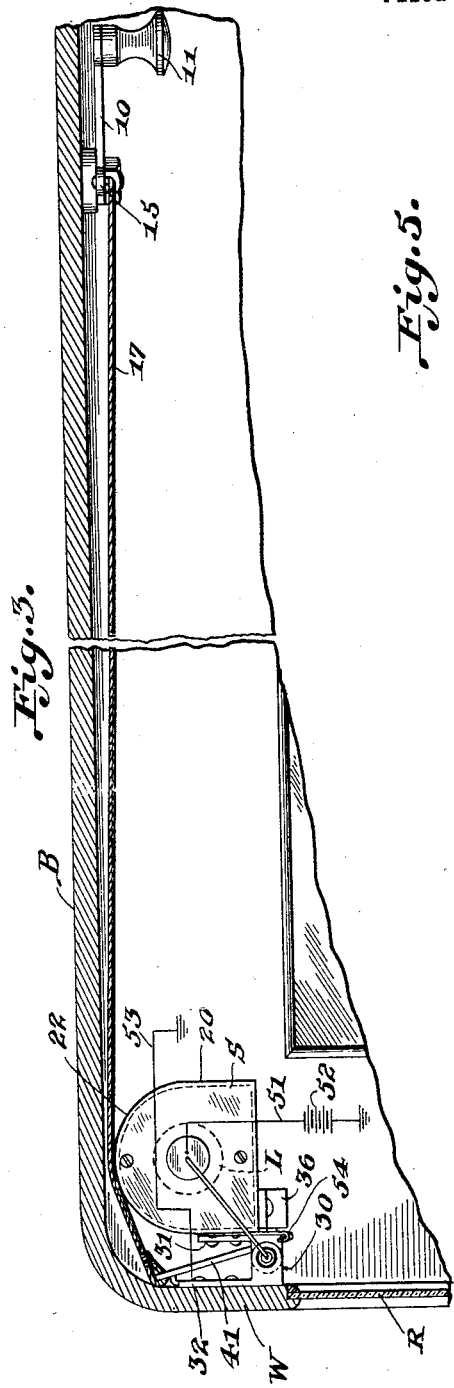
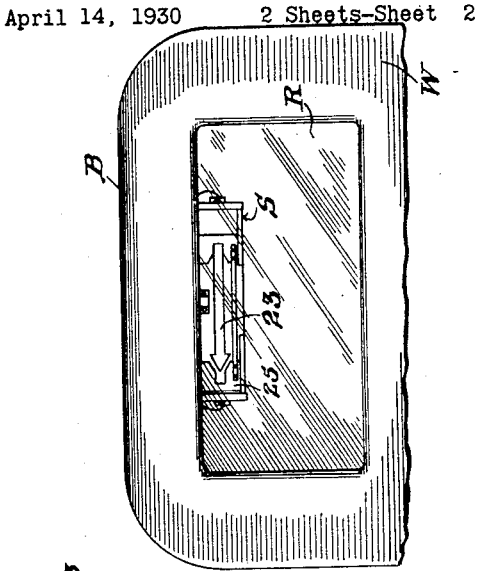
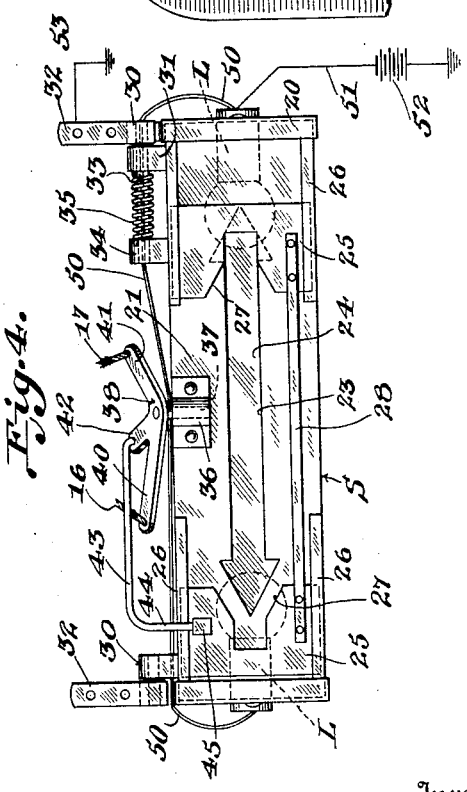
Inventors
Louis O. Lucka
John W. Easley
By
Hubert Peck   Attorney Patented Jan. 5, 1932

1,840,239

UNITED STATES PATENT OFFICE

LOUIS O. LUCKA, OF DECATUR, AND JOHN W. EASLEY, OF CHAMPAIGN, ILLINOIS

VEHICLE DIRECTION SIGNAL

Application filed April 14, 1930. Serial No. 444,264.

This invention relates to certain improvements in vehicle direction signals; and the nature and objects of the invention will be readily recognized and understood by those skilled in the art to which it relates in the light of the following explanation and detailed description of the accompanying drawings illustrating what we at present consider to be the preferred embodiments or mechanical expressions of our invention from among various other forms, arrangements, combinations and constructions of which the invention is capable within the spirit and the scope thereof.

In the operation and use of vehicles, particularly those of the automotive types, it is essential for driving safety and to secure proper traffic conditions, that the driver of a vehicle indicate to the drivers of following vehicles when it is his intention to make a turn, and especially whether such turn is to be to the right or to the left. In order that any means or mechanism shall be effective in giving a clear and attention attracting signal indicating the direction in which a driver proposes to make a turn, such signal must be displayed and given at and from a point on the vehicle such that it lies within the normal range of vision of following drivers in operating their vehicles, so that when the signal is given it is brought distinctly and clearly into the vision and to the attention of the following driver without effort on the following driver's part and without sufficiently detracting his vision from that necessary to operate his vehicle. It is further highly desirable that the direction indicating means or mechanism shall be located and mounted at such a point on the vehicle that it will be protected from damage through accidental contacts or blows and will also be shielded and protected from weather conditions, yet at such a location in which it can fulfill the above mentioned requirements as to visibility to following drivers.

It is therefore to the problem of efficiently signaling and indicating to the drivers of following vehicles, the direction in which the driver of a vehicle is going to turn such vehicle, that the present invention is directed and the invention holds as a general object the provision of a signaling means or mechanism which is mounted in such a position on the vehicle that it will when operated to give the direction signal or indication, do so at a point lying within the normal range of vision of a following driver to clearly and distinctly give the direction indication in a clear and attention attracting manner, but without requiring the driver of a following vehicle to change his range of vision from that required for safe and normal driving.

A feature and characteristic of our invention resides in mounting such a direction indicating signal within the vehicle body adjacent the rear or back window of the vehicle in normal inoperative position invisible through such window, but which is movable when operated to give a direction indicating signal to a position visible and displayed through the rear window where it lies and gives its direction indication at a point substantially in line with the direct vision of the operator of a following vehicle in his normal position driving or operating such vehicle, and further in so arranging such signal that upon termination of its operation to give the direction signal or indication visible through the rear window, it is moved or returned to its normal concealed and inoperative position completely removed from and unobstructing vision through the vehicle rear window by the driver or occupants of the vehicle.

A further feature of the invention resides in the provision of direction indicating signal means or mechanism which includes a mechanically simple and compact signal giving unit movable by the operator to and from operative position displayed through the rear window of the vehicle and which unit is selectively operable by the driver to clearly display a signal or symbol indicating that the vehicle will turn either to the right or to the left.

A further feature of the invention is to provide such a direction indicating signal unit which is electrically illuminated to render the signal given clearly visible, and to provide for automatically rendering the illuminating means operative when the signal unit is moved to displayed position and for rendering the illuminating means inoperative with the signal unit in its normal concealed and inoperative position.

Another feature of the invention resides in providing an arrangement and construction of the signal unit so that it can be readily mounted and installed in position on a vehicle and which when installed will occupy a minimum of space and will be dependable and efficient in operation.

Another feature of the invention is to provide a construction and arrangement of mechanically efficient operating mechanism under the control of the operator for selectively causing the signal unit to give the desired left turn or right turn indication; and further to provide such operating mechanism which can be directly under the manual control of the operator or which can be operatively associated with and actuated by and from the vehicle steering mechanism through the manual operation of such steering mechanism by the vehicle driver.

With the foregoing and certain other objects and results in view which will be apparent from the following explanation, the invention consists in certain novel features in construction and arrangement and combination of elements as will be more fully and particularly referred to and specified hereinafter.

Referring to the accompanying drawings in which similar reference characters refer to corresponding parts throughout the several fingers thereof:

Fig. 1 is a view in top plan of a signal and a form of operating mechanism therefor, mounted on and in a vehicle in accordance with the invention, a portion of the vehicle rear wall to which the signal unit is mounted being shown; and the signal unit and its operating mechanism being shown in operative direction indicating position visible through the rear window of the vehicle. The finger also illustrates diagrammatically in dotted line the position assumed by the operating mechanism with the signal unit in inoperative position moved from its operative signal giving display position through the rear window.

Fig. 2 is a view in end elevation of the signal and its operating mechanism of Fig. 1 with the signal operated to give the direction indication visible through the rear window of the vehicle, and showing the vehicle top and rear walls in vertical longitudinal section.

Fig. 3 is a view similar to Fig. 2 with the signal unit and its operating mechanism in normal inoperative position removed from and invisible through the vehicle rear window.

Fig. 4 is a view in elevation of the signal unit and a portion of its operating mechanism, particularly showing the arrangement for selectively giving a signal indicating either a right or left turn, and showing further the arrangement of illuminating means for the unit and the automatically operated electric circuit therefor.

Fig. 5 is a view in rear elevation of the rear of a vehicle body and the rear window thereof with the signal unit of the invention in operative position visible through the rear window and giving a direction indicating signal.

In the form and arrangement of a signal and its operating mechanism illustrated herewith by way of example, the signal unit S is mounted on the interior of a vehicle body B on the rear wall W thereof and above the rear window R in such rear wall, for movement to and from normal inoperative position above the window R, to operative direction signal giving position at and visible through this rear window R from the rear of the vehicle. It is to be understood, however, that while we have selected in our preferred form of the invention the mounting of the signal unit in normal inoperative position above the rear window, the invention is not restricted or limited to such position as the invention contemplates and includes mounting at other positions within the vehicle either to one side of or below the rear window, or at other points within the vehicle body if desired or found expedient. A broad and generic characteristic of the invention resides in the provision of a direction indicating signal unit mounted within a vehicle and movable from normal position concealed from view from the exterior of the vehicle, and movable to position on the interior of the vehicle to give a direction signal visible through an opening in the vehicle from the exterior thereof.

In carrying out the broad feature and characteristic of the invention in one possible practical mechanical expression thereof as illustrated herewith, the direction signaling unit S is pivotally mounted in position on the interior of the vehicle body above the rear window thereof and is swingable downwardly by a suitable operating mechanism to the position shown in Fig. 2 where it is visible through the rear window R from the exterior of the vehicle. Suitable operating mechanism is provided for swinging the signal unit S to and from its operative position and in the example hereof this operating mechanism is of the type for manual operation by the driver of the vehicle from his position in the driver's seat so that he can swing the signal unit to operative position visible through the rear window R and at the same time selectively cause the signal unit to give an indication of the direction in which he proposes to turn the vehicle. While we have shown for purposes of the present example, operating mechanism of the manually controlled and actuated type, for the signal unit S, we contemplate and the invention includes the use of any of the well known types of direction signal operating mechanism which are operatively associated with a vehicle steering mechanism for actuation thereby when the driver turns his vehicle so as to cause the direction signal means to give an indication of the direction in which the vehicle is being turned. However, while the invention includes the use of such steering gear controlled signal operating mechanism, attention is directed to the fact that in its preferred form the manually actuated mechanism illustrated herewith is used because it enables the driver of the vehicle to give his direction indicating signal in advance of actual turning of the vehicle, thus enabling following drivers to be warned in advance of the turn about to be made.

The operating mechanism for the signal unit S which we have shown in the illustrated example, referring now to Figs. 1 and 2 of the drawings in particular, embodies a lever 10 having an operating handle 11 pivotally mounted in a substantially horizontal position on a vertical pivot pin 12 on the inner side of the vehicle body top preferably in position along the longitudinal axis of the vehicle and adjacent and accessible to the hand of a driver seated in the driver's seat of the vehicle (not shown), such lever 10 being swingable or rockable about the pivot 12 in a substantially horizontal plane (see Fig. 2). Longitudinally alined opposite arms 14 and 15 extend laterally from the inner or pivoted end of the lever 10 and these arms 14 and 15 are connected by the cables 16 and 17 respectively, which extend from and are secured to the outer ends of the arms rearwardly along the top of the vehicle to the signal unit S with which they are operatively connected, as will be more fully referred to hereinafter. With the signal unit S in its normal raised and inoperative position the lever 10 is disposed and extends in a direction longitudinally of the vehicle, with the alined arms 14 and 15 disposed transversely of the vehicle, as indicated in dotted lines by Fig. 1. When the driver of the vehicle wishes to operate his signal unit S to cause it to give a signal indicating a turn either to the right or the left he reaches up and grasps the handle 11 of lever 10 and swings the same in the direction in which he proposes to make his turn, either to the right or to the left, and in accordance with the invention the cables 16 and 17 will be actuated to swing the signal unit S to position visible through the rear window R and will further cause operation of the unit S to give the signal indicating the direction of the turn which is about to be made.

The signal unit S of the example hereof is formed by an elongated casing or box like structure having closed opposite end walls in the form of flange plates or caps 20 fitting over and secured to the opposite ends of the casing and having the substantially flat signal indicating symbol carrying front wall 21 and the opposite side wall 22 outwardly curved to form on the interior of the casing opposite the wall 21 what is in effect a curved light reflector facing such wall 21. The flat front wall 21 is longitudinally cut out to provide the double end direction indicating symbol or arrow shaped opening 23 therethrough, referring now to Fig. 4 of the drawings in particular. This opening 23 is covered by a suitable transparent material, preferably red in color, such as a sheet or plate of red glass or the like transparent material 24. In this manner a colored double headed arrow is formed in the wall 21 pointing in opposite directions longitudinally of the casing that is to the right and to the left of the vehicle. A pair of spaced slides or the like 25 are mounted for reciprocation longitudinally of the front wall 21 of the signal unit S in the pairs of upper and lower guides 26 disposed along the upper and lower edges of wall 21 adjacent opposite ends thereof, respectively. These slides 25 mounted in the guides 26 are each formed with a cut-away portion 27 in alinement with the arrow shaped opening 23 and the opposite arrow heads thereof, and are so spaced apart and joined by the connecting rod or link 28 for movement in unison longitudinally of the signal unit that with one slide at its limit of outward movement the cut-away portion thereof exposes the adjacent head of the arrow 23, while the opposite slide is moved inwardly to a position over and masking the adjacent head of the arrow 23. In this manner the arrow 23 appears as a single headed arrow pointing in the direction of the exposed head, as will be clear by reference to Fig. 4. By reciprocating the slides in the reverse direction the exposed arrow head is covered up by the adjacent slide 25, while the masked head then becomes exposed by its adjacent slide 25 to form an arrow pointing in the reverse directon.

The signal unit S is arranged to be mounted within a vehicle body B to vertical swinging movement to and from operative position and in the form and arrangement of this unit here disclosed opposite end hinge members 30 are secured to the upper side of the casing by the leaves 31 thereof, while the leaves 32 of these hinges are secured in position on the interior of the rear wall W above the rear window R of the vehicle body B, with the signal unit S disposed transversely and horizontally of the vehicle for vertical swinging on the horizontal axis formed by the hinges 30. One of the hinges 30 referring particularly now to Fig. 4 is formed with the hinge or pintle pin 33 carried by the leaf 32 thereof with the casing carried leaf 31 rotatably mounted on this pin. The pin extends inwardly from leaf 31 a distance across the casing to and is journaled at its end in a lug 34 carried by the casing, and a coiled spring 35 is mounted on and secured at one end to this pin 33, while the opposite end of the spring is secured to the lug 34. This spring 35 is so arranged as to normally swing the signal unit S upwardly to and maintain it in its normal raised and inoperative position as shown in Fig. 3 of the drawings.

A vertically disposed bearing bracket 36, referring again particularly to Fig. 4 is secured to the front wall 21 of the signal unit along the transverse center thereof and a stub shaft 37 is rotatably mounted therein and extends upwardly therefrom. A lever member 38 is mounted on and carried by the upper end of shaft 37 and extends inwardly a distance over and across the casing of unit S, this lever member 38 being inclined outwardly from the casing and consisting of the diverging arms 40 and 41 with the central or intermediate arm 42 extending inwardly therebetween. In this manner the arms 40, 41, and 42 radiate from the shaft 37 and the lever member 38 is substantially horizontally rockable on and around shaft 37 as an axis. The intermediate arm 42 of lever member 38 is operatively connected by the connecting rod 43 with one of the slides 25. This connecting rod 43 is pivotally connected at one end to the outer end of arm 42 and extends outwardly to and terminates in the depending portion 44 which is pivotally secured to a lug or bearing block 45 fixed to one of the slides 25. In this manner rocking of lever member 38 will cause reciprocation of the connected slides 25.

In mounted and installed position as shown particularly by Fig. 1, the signal unit S is mounted with its transverse center along the longitudinal center of the vehicle, and the pivot 12 for the operating lever 10 is mounted in the vehicle forwardly of the unit S in alinement with the transverse center of unit S and the longitudinal center of the vehicle. The cables 16 and 17 which are of equal length are connected at their rear ends to the outer ends of the diverging arms 40 and 41, respectively, of the crank member 38 of signal unit S and in neutral or central position of lever 10 with the arms 14 and 15 disposed transversely of the vehicle, the crank member 38 is in a central position with respect to unit S and the arm 42 is in longitudinal alinement with the operating lever 10, as clearly shown by the dotted lines position of these various members in Fig. 1. When the operating lever 10, cables 16 and 17, and lever member 38 are in this central or neutral position, the signal unit S is in its raised position swung upwardly on the hinges 30 with the signal forming wall 21 on the under side, as shown in Fig. 3. Now when the operating lever 10 is rotated either to the right or to the left either the arm 14 or the arm 15 is swung forwardly of pivot 12 and its corresponding cable 16 or 17 is pulled forwardly and exerts a forward pull on the lever member 38. This results in swinging the signal unit S on the hinges 30 from its raised position of Fig. 3, downwardly to its operative lowered position of Figs. 2 and 5, with the signal carrying wall 21 thereof displayed at and visible through the rear window of the vehicle. When either of the cables 16 or 17 is pulled forwardly, simultaneously with the downward swinging of signal unit S, either the arm 40 or 41 as the case may be is drawn inwardly and the lever member 38 is rotated or rocked on shaft 37 to move the slides 25 either to the right or to the left to cause the arrow 23 to give the desired direction signal. Upon release of the operating lever 10 the spring 35 on the signal unit S swings the signal unit S upwardly from its lowered operative position and returns it to its normal raised inoperative position of Fig. 3.

Preferably the signal unit S is provided with electric lights for illuminating the transparent glass or other material 24 covering the arrow 23 and in this instance an electric lamp L is mounted in each of the casing end closures or caps 20, with the lamp base removably mounted in and axially of such closure 20 and the lamp disposed inwardly within the unit casing. Preferably, although not necessarily these lamps L are of a ruby or red color. In order that the lamps L will only be operated when the signal unit is swung into its downward and operative position, an arrangement of the lamp circuits and a controlling switch therefor is provided so that the lamp circuit is broken with the signal unit in raised position and automatically closed when the unit is downwardly swung to operative position. For example we have shown the possible arrangement for carrying out this feature of the invention in the accompanying drawings, in which one terminal of the lamp is in electrical contact with the casing end closures 20, which are preferably of metal. The other terminals of the lamps L are electrically connected by a wire 50 and this connecting wire 50 is in electrical connection with a wire 51 leading to one terminal of a source of current such as battery 52, the other terminal of this battery being grounded. One of the hinge levers 32 is grounded by wire 53, referring now to Fig. 4 of the drawings, and this lever 32 is suitably insulated from the casing and the lamp carrying end closures 20 thereof. A spring contact arm 54 referring now to Figs. 2 and 3 of the drawings in particular is fixed to the end closure 30 adjacent the hinge leaf 32 which is grounded by wire 53, and this contact arm 54 is so arranged that with the signal unit in its raised inoperative position of Fig. 3, it is out of contact with leaf 32 and the circuit to the lamps is thus broken, (see Fig. 3), but upon downward swinging of signal unit S to the lowered operative position of Fig. 2, the contact arm 54 electrically engages the adjacent hinge leaf 32 and the circuit through the lamps is closed with resulting illumination of the direct indicating arrow.

In use on a vehicle, when the driver for example proposes to turn to the left, he grasps handle 11 of operating arm 10 and throws the same to the left into the position shown in Fig. 1. This results as previously explained in swinging the signal unit S downwardly to position with the arrow 23 thereof displayed through the vehicle rear window R. At the same time the lever member 38 is rotated by cables 16 and 17 to the left, which causes connecting rod 43 to move the slides 25 to the left with the right hand slide covering the right hand arrow head and the left hand slide exposing the left hand arrow head, referring now to Fig. 4, so that an arrow pointing to the left is formed and clearly and distinctly visible through the rear window of the vehicle. When the signal unit S reaches its lowered operative position the circuit through lamps L is closed and these lamps are lighted to illuminate the transparent colored arrow. After the desired direction indicating signal has been given in the manner aforesaid, the driver releases operating lever 10 and by the aid of spring 35 the signal unit S is raised and swung upwardly to the position of Fig. 3 completely concealed from view through rear window R and unobstructing this window for normal vision therethrough by the driver. With the signal unit in its raised inoperative position and all of the operating mechanism returned to neutral, the circuit through the lamps L is broken and the lamps are rendered inoperative until the next signal giving operation. In order to give a signal indicating a turn to the right, the reverse of the foregoing operation is followed, that is the operating lever 10 and handle 11 are swung to the right which swings the signal unit to lowered position and causes the slides 25 to be moved to the right to mask the left hand arrow head and expose the right hand arrow head.

The direction indicating signal and its operating mechanism are simple and efficient in operation; are capable of installation within a vehicle at points at which they will not interfere with normal use of the vehicle; and operate to give a clear and distinct direction indicating signal at a point on the vehicle such that the signal lies within the normal range of vision of the driver of a following car. The signal unit and its operating mechanism can be readily mounted and installed in a vehicle and when once installed will require a minimum of maintenance and will be efficient and effective in operation and use to give the required signals.

It is also evident that various other changes, modifications, variations, substitutions and additions might be resorted to without departing from the spirit and the scope of our invention and hence we do not wish to limit ourselves to the exact and specific disclosures hereof.

Desiring to protect our invention in the broadest manner legally possible, what we claim, is:

1. The combination with a vehicle body having a window therein, of a vehicle direction signal indicating unit having direction indicating symbols thereon, said unit pivotally mounted adjacent said window in position concealed from view through the window from the exterior of the body, and swingable vertically on an axis transverse of the vehicle body to position visible through the window to display the direction indicating symbols therethrough, and means for bodily swinging said signal unit to and from position displaying said symbols through the window.

2. The combination with a vehicle body having a rear window therein, of a visual direction signaling unit swingably mounted on a horizontal axis disposed transversely of the vehicle body in position above said rear window normally substantially concealed from view therethrough from the exterior of the vehicle, said unit having a direction indicating symbol thereon and bodily swingable downwardly to position displaying the symbol through such window, and mechanism under the control of a driver for swinging said unit to and from operative position visible and displaying the symbol thereon through said rear window.

3. The combination with a vehicle body having a rear window therein, of a signal unit embodying a casing pivotally mounted above said window for vertical swinging to and from position in front of and visible through the window, said unit in upwardly swung position removed from the window and substantially concealed from view therethrough, yielding means normally maintaining said unit in upwardly swung position, and means for swinging said unit downwardly against said yielding means, embodying an operating lever mounted on the vehicle top for horizontal swinging in a plane above the plane of the axis on which the unit is vertically swingable; a transverse arm on said operating lever, and cables connected to opposite ends of said arm and extended rearwardly to and over said unit in upwardly swung position thereof, the said cables connected to said unit at points thereon spaced from the axis on which the unit swings.

4. The combination with a vehicle body having a rear window therein, of a signal unit embodying a casing pivotally mounted above said window for vertical swinging on a horizontal axis to and from position in front of and displaying the signal side thereof through the window, said unit in upwardly swung position removed from the window and substantially concealed from view therethrough with the signal side thereof lowermost yielding means normally maintaining said unit in upwardly swung position, direction signals on the signal side of said casing, reciprocating slides over said signal face for alternately exposing one while masking the other of said signals, lever mechanism for reciprocating said slides and extending across an adjacent side of said casing radially from the axis on which the casing swings, mechanism for swinging said unit downwardly against said yielding means, embodying an operating lever handle mounted on the vehicle top forwardly of said unit for horizontal swinging in a plane above the plane of the axis on which said unit is vertically swingable, a transverse arm on said operating lever handle, and equal length cables connected to opposite ends of said transverse arm and extended rearwardly to and over said casing in its upwardly swung position, said cables connected to said slide reciprocating lever mechanism on the unit casing at points above the swinging axis of the unit, said unit swung downwardly upon horizontal swinging of said lever handle and said lever mechanism simultaneously actuated by said cables to reciprocate said slides in accordance with the direction of swinging of said lever handle.

5. In combination, a visual direction indicating signal unit pivotally mounted for swinging to and from a single operative signal displaying position, mechanism on said unit for selectively displaying the desired direction signal, and operating means associated with said unit and with said mechanism for simultaneously swinging the unit to the operative displaying position and actuating said mechanism to display the desired signal.

6. In a vehicle direction indicating signal, in combination, a direction indicating signal unit pivotally mounted for swinging to and from signal displaying position, a visual direction symbol on one side of said unit, selective mechanism on the unit for causing said symbol to visually indicate a desired direction, operating means for swinging said unit to and from operative position, and mechanism operatively associating said selective mechanism on the unit with said operating means to cause simultaneous operation of the selective mechanism to display the desired direction symbol when the unit is swung to signal displaying position.

7. In a vehicle direction indicating signal, in combination, a direction indicating signal unit embodying a casing having direction indicating symbols on one side thereof, said unit mounted horizontally disposed for vertical swinging on an axis disposed along a lower edge thereof with the unit in normal upwardly swung position and the direction symbol side thereof downward, yielding means normally maintaining said unit in upwardly swung position, and means for swinging said unit downwardly to operative position against said yielding means; embodying a horizontally swingable lever mounted spaced from said casing at the opposite side thereof on which the unit is swingable, said lever in position substantially parallel with the casing when the latter is in upwardly swung position, and equal length cables extended from opposite ends of said lever to and across said signal unit and connected thereto at points above the axis on which the unit is swingable.

Signed at Champaign, Champaign County, Illinois, this 24th day of March, 1930.

LOUIS O. LUCKA.

Signed at Decatur, Macon County, Illinois, this 26th day of March, 1930.

JOHN W. EASLEY.